G. ROUMELIOTE.
CONFECTION DISPENSING DEVICE.
APPLICATION FILED JULY 29, 1918.

1,316,648.

Patented Sept. 23, 1919.
2 SHEETS—SHEET 1.

INVENTOR: Geo. Roumeliote
BY Milton C. Crandall ATTORNEY

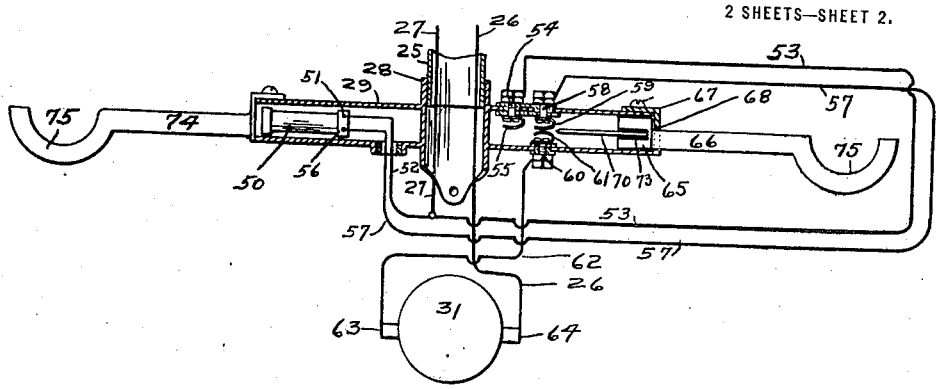

UNITED STATES PATENT OFFICE.

GEORGE ROUMELIOTE, OF SIOUX CITY, IOWA, ASSIGNOR TO CHRIS ROUMELIOTE, OF SIOUX CITY, IOWA.

CONFECTION-DISPENSING DEVICE.

1,316,648.      Specification of Letters Patent.     Patented Sept. 23, 1919.

Application filed July 29, 1918. Serial No. 247,169.

*To all whom it may concern:*

Be it known that I, GEORGE ROUMELIOTE, a citizen of the United States, and a resident of Sioux City, in the county of Woodbury and State of Iowa, have invented certain new and useful Improvements in Confection-Dispensing Devices, of which the following is a specification.

The invention contemplates an improved automatic dispensing apparatus embodying certain novel features of construction and arrangement of parts, particularly adapting the device for pastry and confection making.

In the manufacture of candy a funnel is employed as a container for syrup and soft candy, the funnel being provided with a plunger to open and close the funnel outlet. In use the operator supports the funnel above a table with one hand while the other hand is used to reciprocate the plunger to intermittently eject small quantities of the candy onto a table, the funnel being incidentally moved laterally to distribute the lumps of candy on the table.

The objects of the present invention are manifold: First, the production of a dispensing mechanism which depends from an upper support and is adapted to be moved laterally; second, the production of a dispensing mechanism to automatically eject uniform quantities of material at uniform intervals; third, the production of an automatic dispensing device adapted to be hung above a table and embodying a dispensing funnel adapted to be readily applied to or removed from the device; fourth, the production of an electrically operated dispensing device to travel upon and be supported by electrical conductors from which the mechanism derives its power; fifth, the production of an improved dispensing device, simple in construction and operation, yet durable, inexpensive and thoroughly efficient.

With these and other objects in view, the invention consisting in the construction, combination and novel arrangement of parts will be fully understood from the following description, reference being had to the accompanying drawings which form a part of this application and in which like characters of reference indicate corresponding parts throughout the several views of which,—

Fig. 5 is a fragmentary vertical section of the conduit and associated parts, the electrical circuit being shown conventionally;

Fig. 6 is a fragmentary central vertical section of the controlling switch;

Fig. 7 is a plan of the same;

Fig. 8 is a longitudinal section of the plunger joint; and

Fig. 9 is a transverse vertical section of the container valve.

Figure 3:
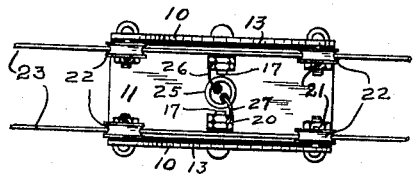
Fig. 3 is a plan of the carriage.
Figure 4:
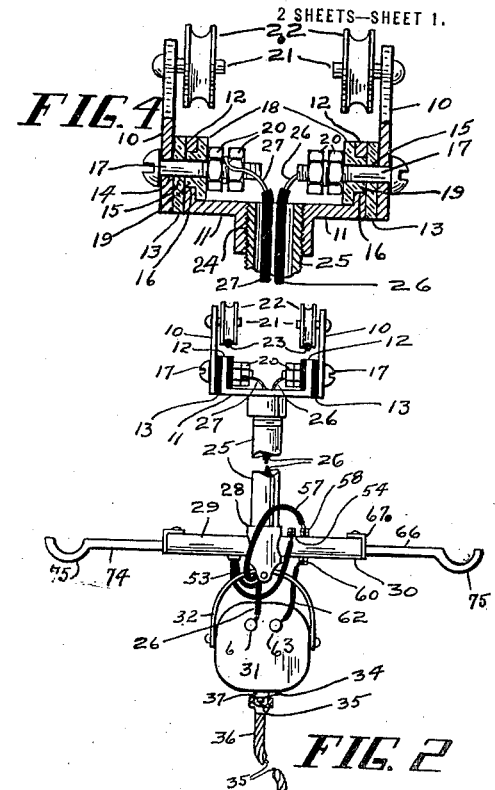
Fig. 4 is an enlarged vertical section of the carriage taken on the line 4 of Fig. 1.
Figure 1:
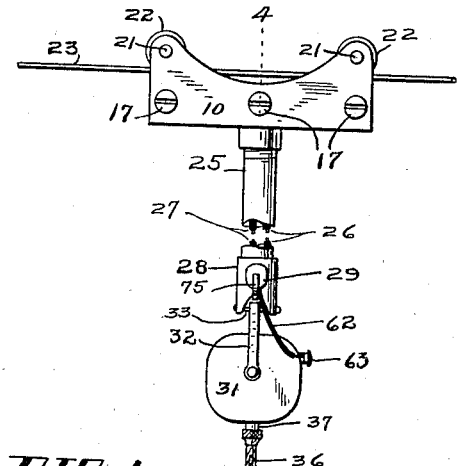
Figure 1 is a front elevation of a device constructed in accordance with the invention, parts being cut away.
Figure 2:
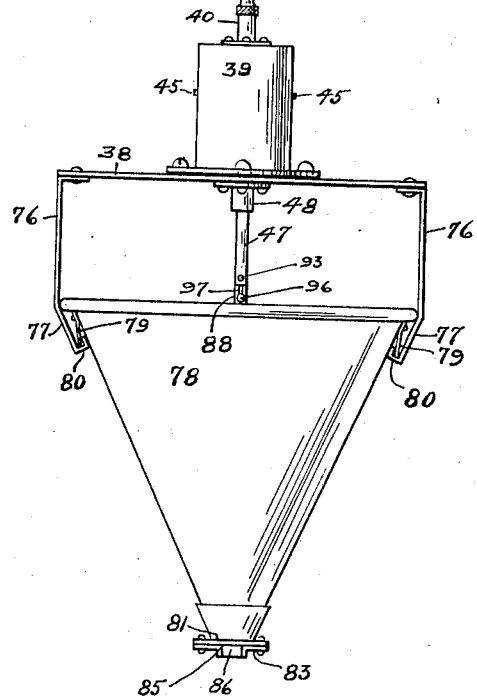
Fig. 2 is a side elevation of the same, parts being cut away and shown in section.
Figure 2:
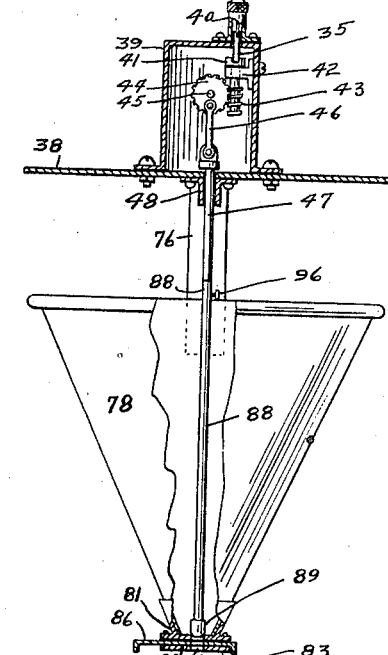

Although I have illustrated and hereinafter described an embodiment of the invention particularly applicable to the art of pastry and confection making, I would not be understood as being limited to the specific structure or use chosen for illustration, for various alterations and modifications may be made in the details of construction and arrangement of parts and it may be applied in many analogous arts without departing from the spirit and scope of the invention as defined in the appended claims.

Referring, now to the illustrations, an advantageous embodiment for practising the invention may consist of a depending element adapted for lateral movement and supporting at its lower end a material container, having an outlet controlled by a mechanically-operated plunger actuated by a mechanism carried by the said element.

In the present embodiment I provide a carriage consisting, preferably, of front and rear plates 10, and a bottom plate or web, 11, which interconnects the plates, 10. The said plates are electrically insulated each from the others, as by forming upwardly-turned flanges, 12, on the sides of the plate, 11, between which, and the plates 10, are interposed insulation strips, 13. Each of the plates, 10, is provided with an opening, 14, registering with an opening, 15, in the adjacent insulating element, 13, and an opening, 16, in the associated flange 12, and through said openings extends a bolt, 17, encircled by insulation washers, 18, formed with bushings, 19, inclosed by the opening, 16, to insulate the bolt from the flange. Nuts and lock-nuts, 20, on the bolts secure the plates 10, firmly to the bottom plate. Adjacent their upper edges the plates, 10, carry inwardly projecting pintles, 21, on which are journaled annularly-grooved wheels, 22, adapted to travel upon parallel electrical conductors, 23, which we will assume, extend between suitable uprights, as the walls of a room, and which may receive electric current from any suitable source of supply.

The center of the bottom, 11, is provided with an opening, 24, into which is threaded a conduit, 25, which incloses electrical conductors, 26 and 27, connected respectively, with the bolts, 17. The lower end of the conduit has oppositely disposed lateral arms, for which purpose, I provide a head, 28, threaded onto the conduit and formed with oppositely-disposed lateral tubular arms, 29 and 30. 31 is an electric motor which depends from the head, 28, as by providing a bail, 32, on the motor which hangs from a cross pin, 33, in the lower end of the head. To the spindle, 34, of the motor is operatively connected one end of a flexible shaft, 35, inclosed by a flexible casing, 36, secured to the motor bearing, 37. The casing 36, supports the dispensing mechanism consisting of a frame having a horizontal plate, 38, on which is mounted a cylindrical housing, 39, provided at its top with a bearing, 40, to which is secured the lower end of the casing, 36. The lower end of the shaft, 35, extends into the housing, 39, and is operatively connected with a spindle, 41, journaled in a bearing, 42, within the housing; and formed with a worm, 43, intermeshed with a worm-wheel, 44, on a shaft, 45, journaled in the walls of the housing. The worm-wheel 44, is connected by a pitman, 46, with a rod, 47, which reciprocates through the plate, 38, and a bearing, 48, on the under side thereof.

The electric circuit includes the motor, a resistance coil and a controlling switch so associated and connected that the switch will open and close the circuit and connect the motor in series with the resistance coil and the conductors, 26 and 27, or connect the motor directly on said conductors. For this purpose I have provided a resistance coil, 50, which is inclosed within the arm, 29, and one terminal, 51, of which, is connected by means of a conductor, 52, with the conductor, 27, and a conductor, 53, connected with a binding-post, 54, extending through the wall of the arm, 30, the said binding-post being insulated from the said wall and carrying a contact-spring, 55, within the arm. The other terminal, 56, of the resistance coil is connected by a conductor, 57, with a binding-post 58, mounted in the wall of the arm, 30, in the same manner as the binding-post, 54, and carrying a contact-spring, 59. Opposite the post, 58, is a binding-post, 60, which penetrates and is insulated from the wall of the arm and is provided with a contact-spring, 61. The binding-post, 60, is connected by a conductor, 62, with one terminal, 63, of the motor, the other terminal, 64, thereof being connected directly to the conductor, 26.

The arm, 30, slidably incloses a block, 65, carried by an arm 66, protruding from the end of the arm, 30. On the end of the arm, 30, is provided a movable head, 67, having an opening, 68, to freely receive the arm, 66, the head, 67, serving to prevent displacement of the block, 65, from the arm, 30. The block, 65, is bifurcated as at 69, to receive an elongated blade 70, said block and blade being insulated each from the other as by insulating material, 71, interposed between the blade and the adjacent portions of the block. The said blade is firmly clamped in the block by means of a screw, 72, extending through one side of the block, through a relatively large opening, 73, in the blade and threaded into the opposite side of the block.

By virtue of the structure disclosed it is evident that when the switch blade, 70, is in the relative position shown in Fig. 5, the circuit will be opened and the motor inactive, and when the arm, 66, is thrust inwardly to bring the blade into contact with the contact-springs, 59 and 61, a circuit will be completed through the motor, resistance coil and conductors, 26 and 27, and when the said arm 66, is thrust farther inwardly and the switch blade, 70, brought into contact with the contact-spring, 55, it is evident the resistance coil will be shunted out of the circuit and the motor directly connected to the conductors, 26 and 27.

To counterbalance the arm, 66, and render the device symmetrical I provide a similar arm, 74, suitably secured to the end of the arm, 29. The outer ends of the arms, 66, and 74, are preferably formed with hooks, 75, upon which may be hung utensils used in candy and pastry making.

From opposite sides of the frame member, 38, depend arms, 76, the lower end portions of which are deflected inwardly as at 77, to engage opposite sides of a conically-shaped container, 78, the said container being provided with downwardly-extending ears, 79, engageable in hooks, 80, formed on the extreme ends of the arms, 76. The lower end of the container, 78, is open and covered with a suitable head, 81, having an axial opening 82. To the under side of the head, 81, is secured a plate, 83, having an opening, 84, registering with the opening, 82, the intermediate portion of the plate, 83, being so depressed as to form a transverse passage, 85, between the plate and the head to receive a sliding valve, 86, having an opening, 87, which may be placed in or out of registration with the openings, 82 and 84, to accordingly open and close the lower end of the container.

The rod, 47, carries a plunger, 88, provided on its lower end with a valve head, 89, which opens and closes the opening, 82, of the container head as the plunger is reciprocated by the rod, 47. The plunger, 88, is preferably removably secured to the rod, 47, as by providing their abutting ends with co-acting ears and notches 90 and 91, respectively. Within the plunger, 88, is pivoted one end of a latch-bar, 92, the other end thereof being extended from the plunger and provided with a lateral tongue, 93, adapted for engagement within the opening, 94, in the wall of the rod, 47. A torsion-spring, 95, having one end secured to the wall of the plunger, 88, and the other end engaged with the latch-bar, 92, serves to hold the tongue, 93, normally engaged within the opening 94. A push-button, 96, carried by the latch bar and extended through an opening, 97, in the wall of the plunger affords means for depressing the latch bar to disengage the tongue, 93, from the rod, 47, whereby the plunger may be detached from the rod and removed from the container.

It is evident the container may be readily removed from the supporting frame by first removing the plunger as previously stated and then revolving the container sufficiently to disengage the ears, 79, and hooks, 80.

In operation the candy, or other material to be dispensed is placed in the container, then as the motor operates to reciprocate the plunger, uniform quantities of material will be dispensed at regular intervals from the bottom of the container. While being thus dispensed the portions of material ejected from the container may be distributed upon the board or table by moving the container laterally.

Having thus described my invention, what I claim as new and desire to secure by Letters Patent of the United States, is,—

1. A dispensing device comprising an element adapted to be hung from an aerial support, an electric motor hung on said element, a depending flexible shaft actuated by the motor, a dispensing container supported by the flexible shaft and having a valved outlet, and mechanism actuated by the flexible shaft for opening and closing the valve.

2. A dispensing device comprising an element adapted to be hung from an aerial support, an electric motor hung on said element, a depending flexible shaft actuated by the motor, a container having a dispensing outlet, and mechanism for automatically opening the outlet, including a worm driven by the flexible shaft, a worm-wheel driven by the worm, a rod mounted to reciprocate within the container and carrying a valve to open and close said outlet, and a driving connection between the worm-wheel and rod.

3. A dispensing device comprising an aerial electric current conducting track, a carriage supported thereby to travel thereupon, an electric motor hung from the carriage, means for conducting electric current from the track to the motor and a depending dispensing container having a valved outlet governed by the motor.

4. A dispensing device comprising an aerial electric current-conducting track, a wheeled carriage supported thereby and adapted to travel thereupon, an electric motor depending from the carriage, a dispensing container depending from the motor and provided with a valved outlet, means actuated by the motor for opening and closing the valve, and electric conductors interconnecting the carriage wheels and motor.

In testimony whereof I have hereunto set my hand this 23rd day of July, 1918.

GEORGE ROUMELIOTE.

Copies of this patent may be obtained for five cents each, by addressing the "Commissioner of Patents, Washington, D. C."